United States Patent
Kung (10) Patent No.: US 6,250,940 B1
(45) Date of Patent: Jun. 26, 2001

(54) COMPUTER CONNECTOR THAT CAN PROVIDE BOTH SIGNAL AND POWER CONNECTION OR ONLY A SIGNAL CONNECTION

(75) Inventor: Shao-Tsu Kung, Taipei (TW)

(73) Assignee: Compal Electronics Inc., Taipei (TW)

( * ) Notice: Subject to any disclaimer, the term of this patent is extended or adjusted under 35 U.S.C. 154(b) by 0 days.

(21) Appl. No.: 09/492,672

(22) Filed: Jan. 28, 2000

(51) Int. Cl.$^7$ .................................................. H01R 27/00
(52) U.S. Cl. ............................................ 439/218; 439/222
(58) Field of Search ................................. 439/218, 222, 439/223, 224, 527, 529, 530, 533, 535, 536, 544

(56) References Cited

U.S. PATENT DOCUMENTS

| | | | |
|---|---|---|---|
| 4,756,695 | * | 7/1988 | Lane et al. ............................ 439/535 |
| 5,125,854 | * | 6/1992 | Bassler et al. ........................ 439/536 |
| 5,161,998 | * | 11/1992 | Defibaugh et al. .................. 439/544 |
| 5,328,388 | * | 7/1994 | Fust et al. ........................... 439/540.1 |

* cited by examiner

*Primary Examiner*—Tulsidas Patel
(74) *Attorney, Agent, or Firm*—Winston Hsu (57) ABSTRACT

A connector is used to connect a peripheral device to a computer system. The computer system comprises a housing, and a power supply for supplying electrical power to the computer system. The peripheral device comprises a plug comprising a plurality of signal contacts for transmitting signals. The connector comprises a socket installed on the housing. The socket comprises a plurality of signal contacts electrically connected to the computer system, and a plurality of power contacts connected to the power supply. When the plug of the peripheral device is plugged into the socket of the connector, the signal contacts in the plug of the peripheral device will contact the corresponding signal contacts in the socket so as to transmit signals between the computer system and the peripheral device. The plug of the peripheral device further comprises a plurality of power contacts for connecting to the power contacts in the socket of the connector, so that electrical power can be supplied to the peripheral device through the power contacts. The plurality of the power contacts of the plug can be separated from the plug.

8 Claims, 8 Drawing Sheets

COMPUTER CONNECTOR THAT CAN PROVIDE BOTH SIGNAL AND POWER CONNECTION OR ONLY A SIGNAL CONNECTION

BACKGROUND OF THE INVENTION

1. Field of the Invention

The present invention relates to a connector, and more particularly, to a connector that can provide both signal and power connection or only a signal connection.

2. Description of the Prior Art

Figure 1:
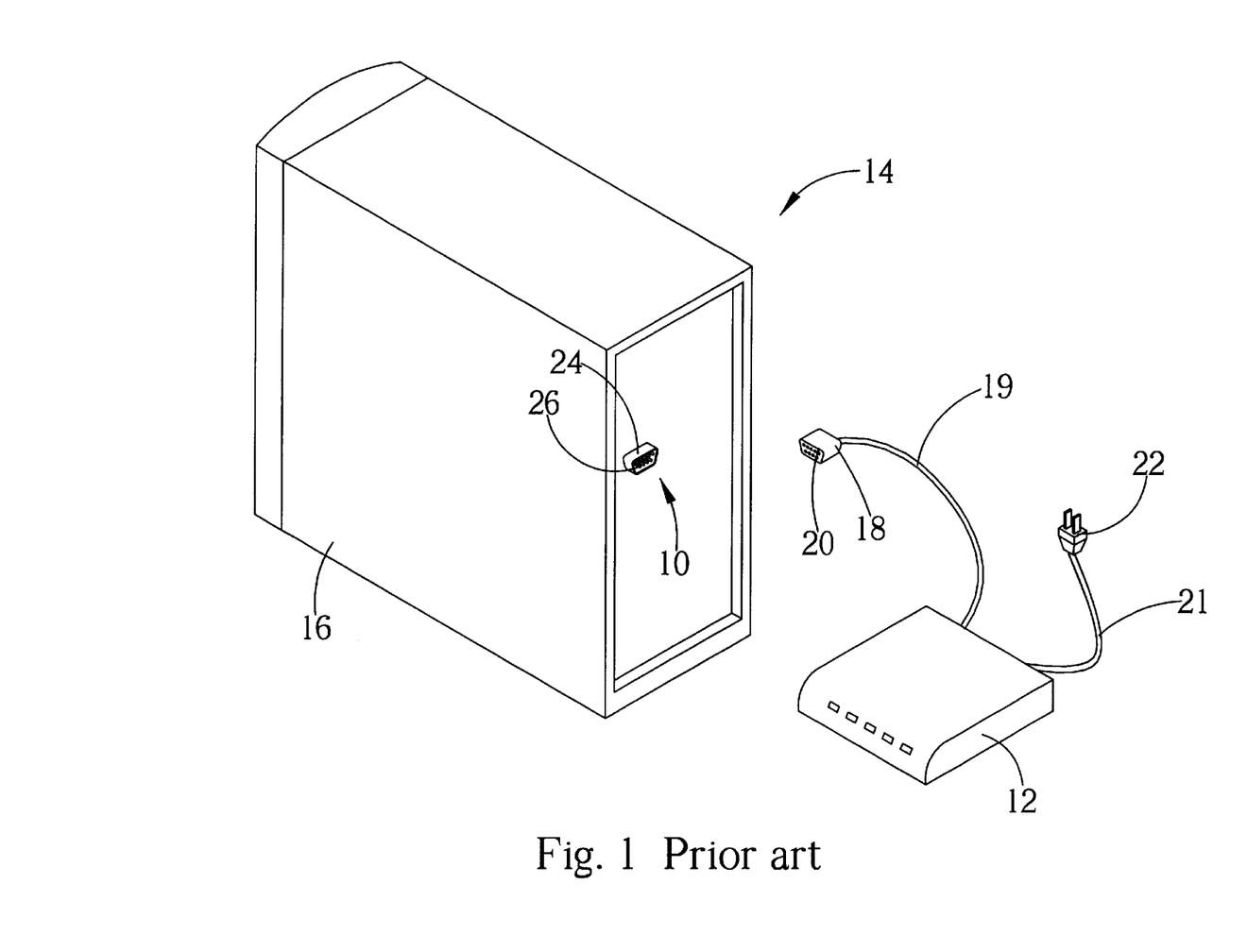
FIG. 1 is a perspective view of a peripheral device connected to a computer system with a prior art connector.

Please refer to FIG. 1. FIG. 1 is a perspective view of a peripheral device 12 connected to a computer system 14 with a prior art connector 10. The connector 10 is used to connect the peripheral device 12 to the computer system 14. The computer system 14 comprises a housing 16, a processor (not shown) installed in the housing 16 for controlling the operations of the computer system 14, and a power supply (not shown) installed in the housing 16 for supplying electrical power to the computer system 14. By way of example, the peripheral device 12 is a modem. The peripheral device 12 comprises a peripheral circuit (not shown) for executing a specific peripheral function, a signal plug 18 electrically connected to the peripheral circuit comprising a plurality of signal contacts 20 for transmitting signals to or from the peripheral circuit, a signal cable 19, a power plug 22 for obtaining electrical power from another power supply, and a power cable 21.

The connector 10 comprises a signal socket 24 installed on the housing 16. The signal socket 24 comprises a plurality of signal contacts 26 electrically connected to the computer system 14. When the signal plug 18 of the peripheral device 12 is plugged into the signal socket 24 of the connector 10, the signal contacts 20 in the signal plug 18 of the peripheral device 12 will contact the corresponding signal contacts 26 in the signal socket 24 so as to transmit signals between the computer system 14 and the peripheral device 12.

As shown in FIG. 1, the signal plug 18 is a platform, and the signal contacts 20 of the signal plug 18 are installed in the platform. The signal socket 24 is a recess, and the signal contacts 26 of the signal socket 24 are installed in the recess.

When a user uses the peripheral device 12 through the computer system 14, the user must plug both the signal plug 18 of the peripheral device 12 into the signal socket 24 of the connector 10, and the power plug 22 of the peripheral device 12 into a power socket (not shown) so as to obtain electrical power.

When a user connects a plurality of peripheral devices, such as speakers, monitors, and external hard disks, to the computer system 14, the user must plug each signal plug of the peripheral devices into its respective signal socket, and each power plug of the peripheral devices into a power socket. As more peripheral devices are used, so more power sockets are required. In this manner, the user frequently runs out of power sockets. Furthermore, each of the peripheral devices comprises two plugs, a signal plug and a power plug, and two cables, a signal cable and a power cable. With more peripheral devices, so more cables, and these cables invariably end up knotted and twisted together. This can be very annoying for the user.

SUMMARY OF THE INVENTION

It is therefore a primary objective of the present invention to provide a connector to solve the above mentioned problems.

In a preferred embodiment, the present invention provides a connector for connecting a peripheral device to a computer system, the computer system comprising a housing, a processor installed in the housing for controlling the operations of the computer system, and a power supply installed in the housing for supplying electrical power to the computer system, the peripheral device comprising at least one peripheral circuit for executing a specific peripheral function, and a plug electrically connected to the peripheral circuit comprising a plurality of signal contacts for transmitting signals to or from the peripheral circuit, the connector comprising a socket installed on the housing, the socket comprising:

a plurality of signal contacts electrically connected to the computer system; wherein when the plug of the peripheral device is plugged into the socket of the connector, the signal contacts in the plug of the peripheral device will contact corresponding signal contacts in the socket so as to transmit signals between the computer system and the peripheral device; and a plurality of power contacts connected to the power supply for supplying electrical power;

wherein the plug of the peripheral device further comprises a plurality of power contacts for connecting to the power contacts in the socket of the connector so that electrical power is supplied to the peripheral device through the power contacts, the plurality of the power contacts of the plug can separate from the plug so that the plug does not comprise any of the power contacts and then another power supply is required for the peripheral device.

It is an advantage of the present invention that the connector can provide both signal and power connection or only signal connection and, thus, users can utilize the peripheral devices with or without requiring external power sockets.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 2A:
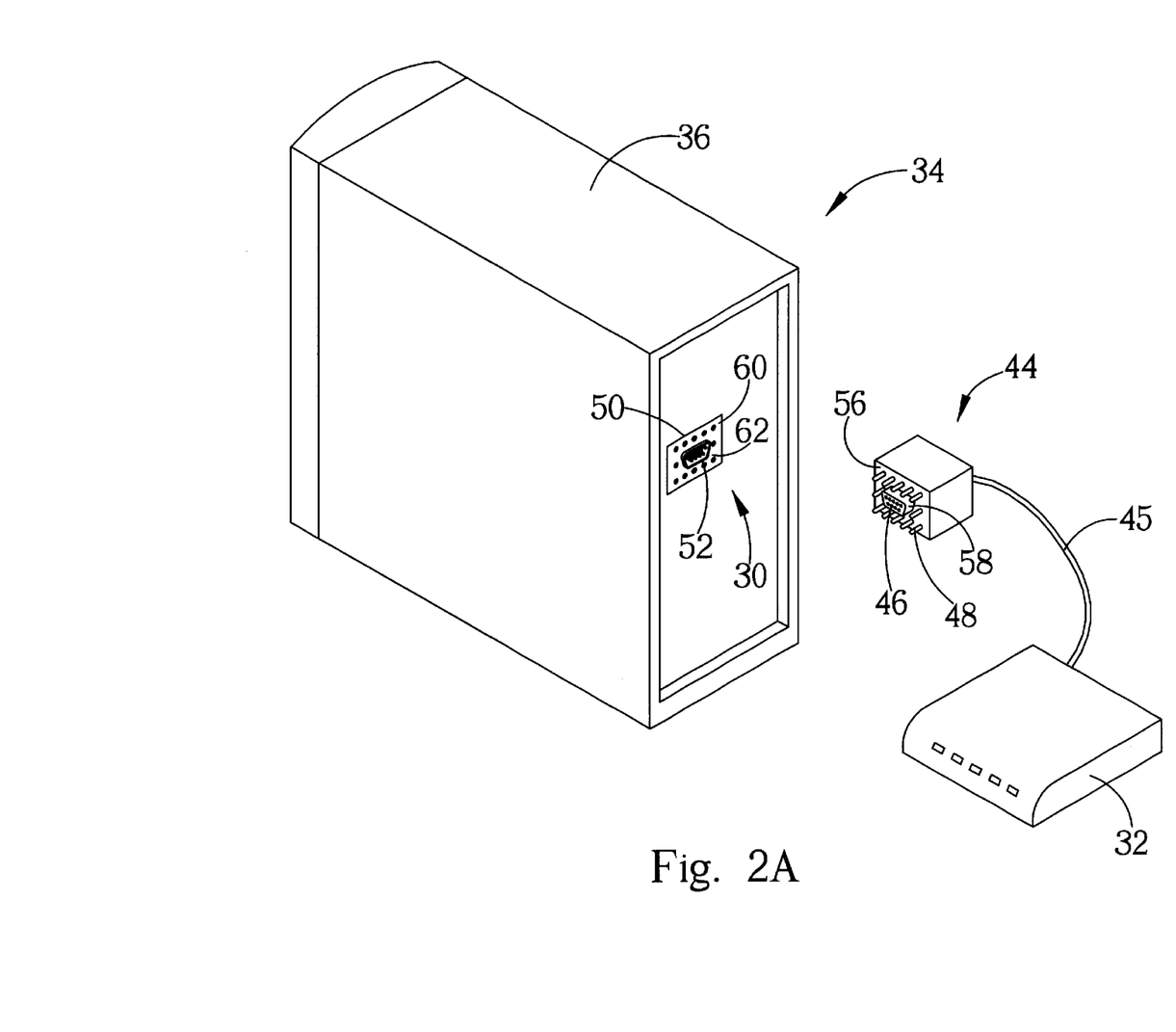
FIG. 2A is a perspective view of a peripheral device connected to a computer system through the connector according to the present invention.
Figure 2B:
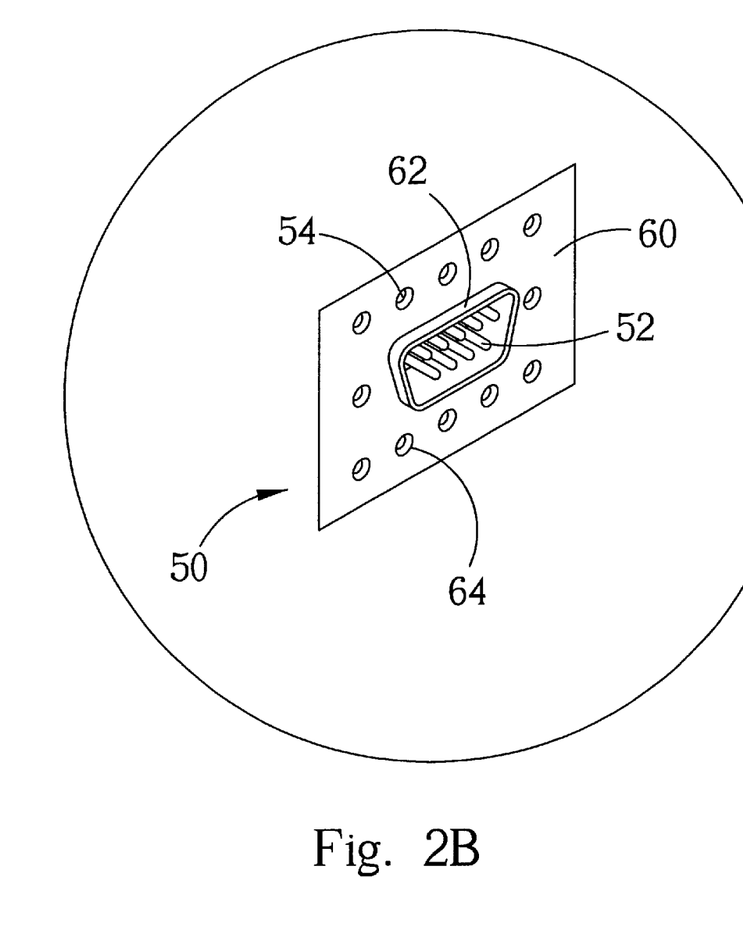
FIG. 2B is an enlarged view of the socket shown in FIG. 2A.
Figure 3:
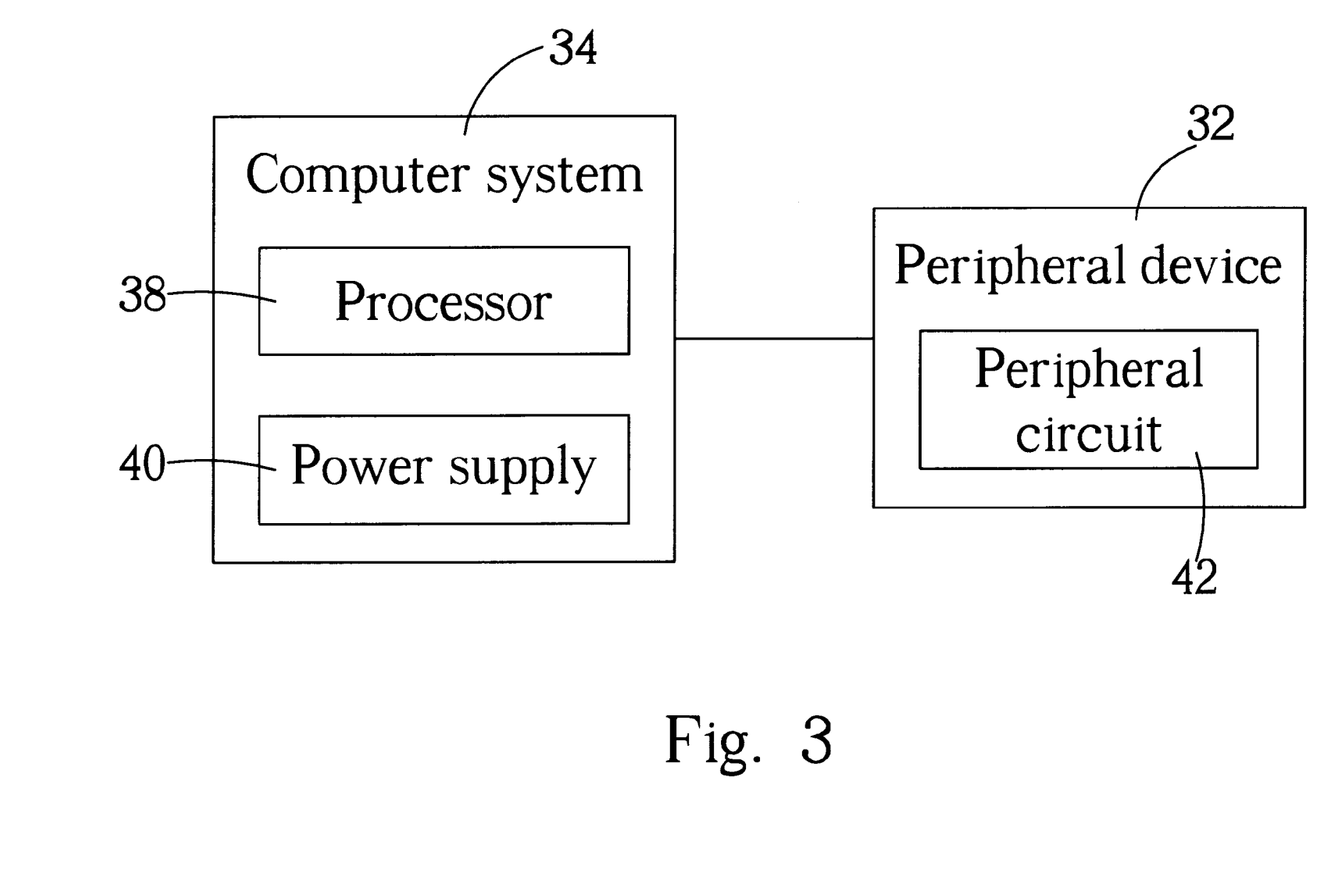
FIG. 3 is a functional block diagram of the computer system shown in FIG. 2.

Please refer to FIG. 2A to FIG. 3. FIG. 2A is a perspective view of a peripheral device 32 connected to a computer system 34 through the connector 30 according to the present invention. FIG. 2B is an enlarged view of the socket 50 shown in FIG. 2A. FIG. 3 is a functional block diagram of the computer system 34 shown in FIG. 2. The connector 30 is used to connect the peripheral device 32 to the computer system 34. The computer system 34 comprises a housing 36, a processor 38 installed in the housing 36 for controlling the operations of the computer system 34, and a power supply 40 installed in the housing 36 for supplying electrical power to the computer system 34.

The peripheral device 32 comprises a peripheral circuit 42 for executing a specific peripheral function, a plug 44 electrically connected to the peripheral circuit 42, and a cable 45 for transmitting signals between the peripheral device 32 and the computer system 34. The plug 44 comprises a plurality of signal contacts 46 for transmitting signals to or from the peripheral circuit 42, and a plurality of power contacts 48.

The connector 30 comprises a socket 50 installed on the housing 36. The socket 50 comprises a plurality of signal contacts 52 electrically connected to the computer system 34, and a plurality of power contacts 54 connected to the power supply 40 for supplying electrical power. The supplied electrical power is usually DC power, but need not be exclusively so. When the plug 44 of the peripheral device 32 is plugged into the socket 50 of the connector 30, the signal contacts 46 in the plug 44 of the peripheral device 32 will contact the corresponding signal contacts 52 in the socket 50 so as to transmit signals between the computer system 34 and the peripheral device 32, and the power contacts 48 in the plug 44 of the peripheral device 32 will contact the corresponding power contacts 54 in the socket 50 so that electrical power is supplied to the peripheral device 32 through the power contacts 54 in the connector 30.

As shown in FIGS. 2A and 2B, the plug 44 comprises a first surface 56 and a platform 58 projecting from a central area of the first surface 56. The signal contacts 46 of the plug 44 are installed in the platform 58, and the power contacts 48 of the plug 44 project from the first surface 56 and surround the platform 58. The socket 50 comprises a second surface 60, a recess 62 installed in a central area of the second surface 60, and a plurality of holes 64 in the second surface 60 that surround the recess 62. The signal contacts 52 of the socket 50 are installed in the recess 62, and the power contacts 54 of the socket 50 are installed in the holes 64 in the second surface 60.

Figure 4:
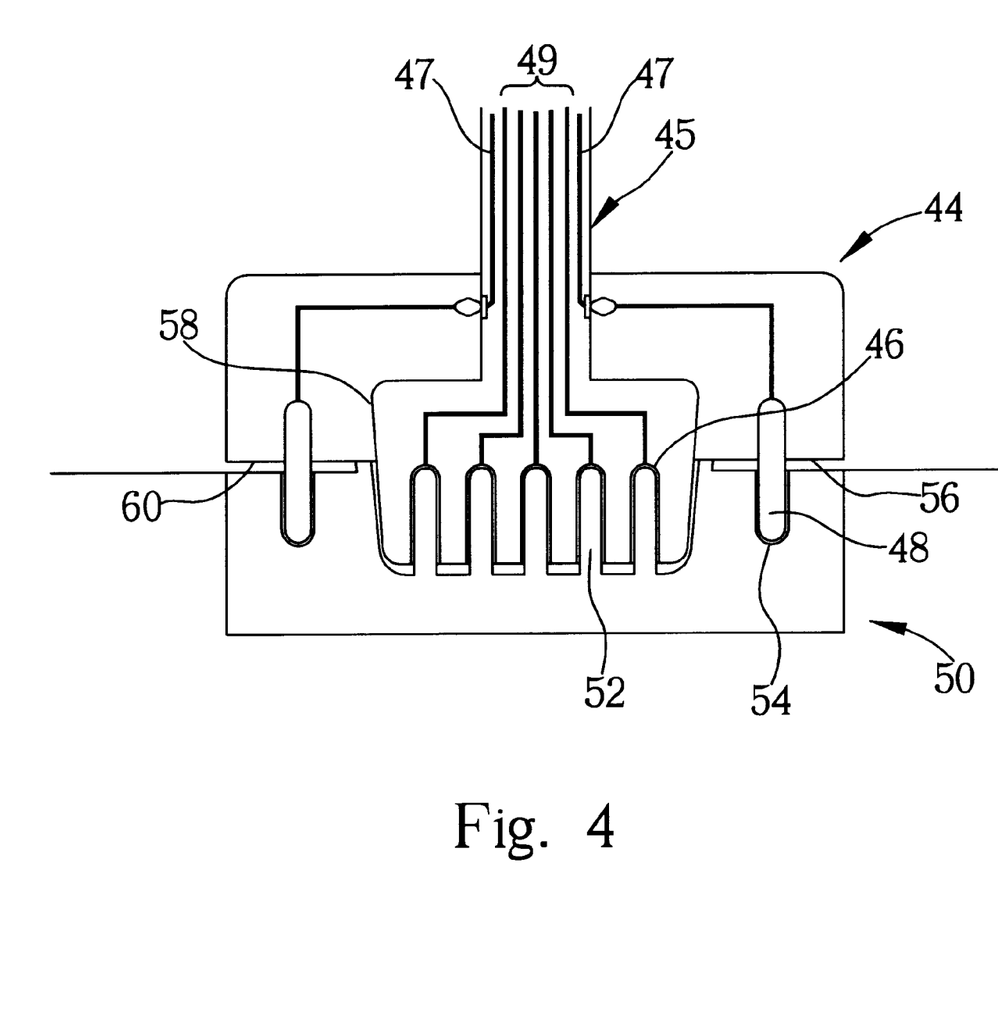
FIG. 4 is a side view of the plug plugged into the socket.

Please refer to FIG. 4. FIG. 4 is a side view of the plug 44 plugged into the socket 50. When the plug 44 is plugged into the socket 50, the platform 58 of the plug 44 is embedded in the recess 62 of the socket 50 so that the signal contacts 46 of the plug 44 are connected to the corresponding signal contacts 52 of the socket 50, and the projecting power contacts 48 of the plug 44 embed into the holes 64 of the socket 50 so that the power contacts 48 of the plug 44 are connected to the corresponding power contacts 54 of the socket 50. Therefore, when the plug 44 is plugged into the socket 50, the peripheral device 32 will be electrically connected to the computer system 34. Signals can be transmitted between the peripheral device 32 and the computer system 34 and, additionally, the power supply 40 of the computer system 34 can supply electrical power to the peripheral device 32.

As shown in FIG. 4, the cable 45 of the peripheral device 32 comprises a plurality of power lines 47 and signal lines 49 connected to the power contacts 48 and signal contacts 46, respectively. The power contacts 48 of the plug 44 can separate from the plug 44. Thus, the portion of the first surface 56 that surrounds the platform 58 and contains the power contacts 48 of the plug 44 is detachably connected to the platform 58.

Figure 5:
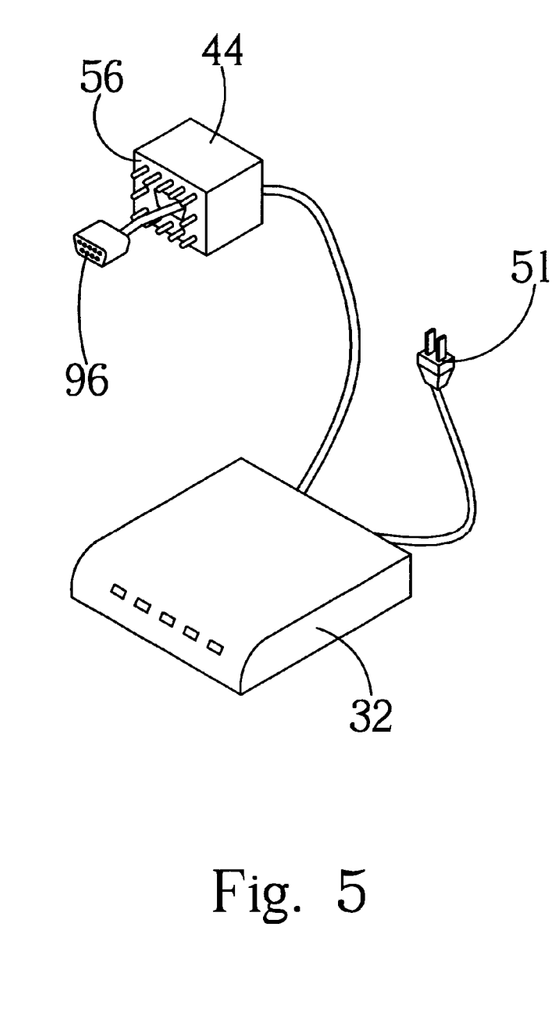
FIG. 5 is a perspective view of the power contacts of the plug separated from the plug.

Please refer to FIG. 5. FIG. 5 is a perspective view of the power contacts 48 of the plug 44 separated from the plug 44. The portion of the first surface 56 that surrounds the platform 58 and contains the power contacts 48 of the plug 44 is detachably connected to the platform 58. When the portion that surrounds the platform 58 is separated from the platform 58, the plug 44 only comprises the signal contacts 44. The peripheral device 32 should further comprises a power plug 51 to obtain electrical power from another power supply.

Figure 6A:
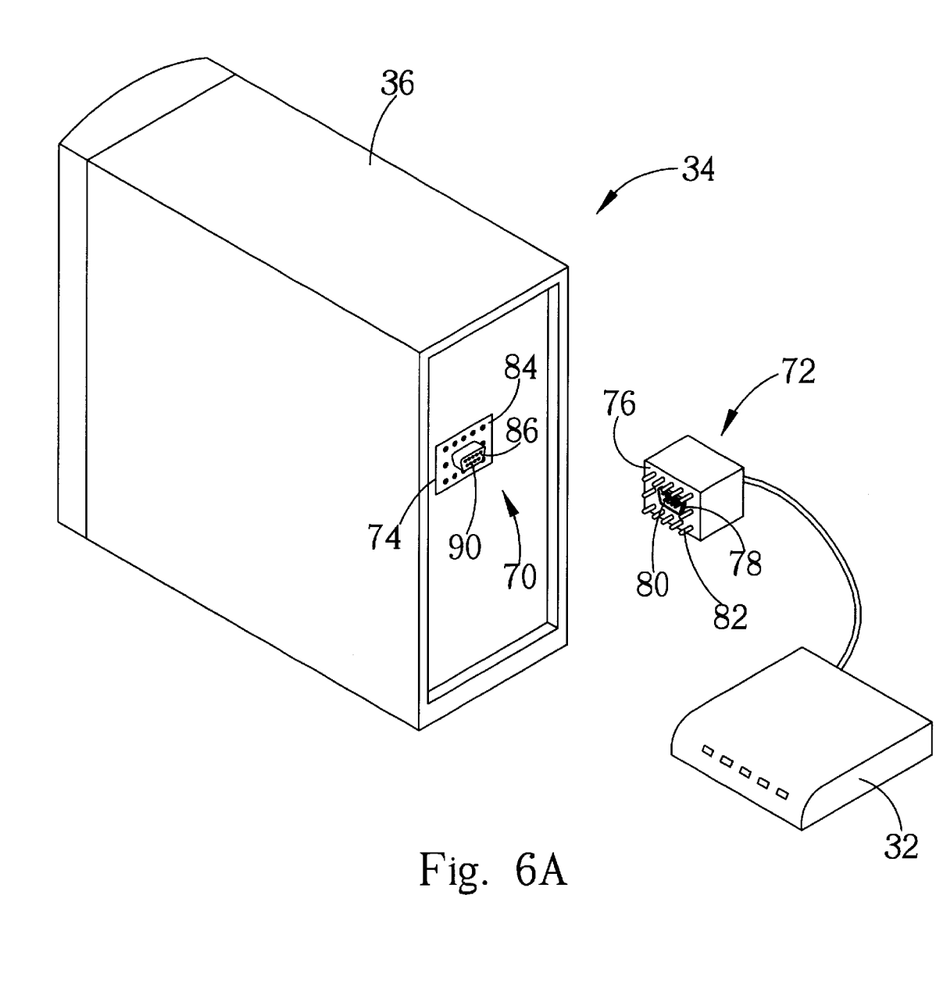
FIG. 6A is a perspective view of another embodiment connector according to the present invention.
Figure 6B:
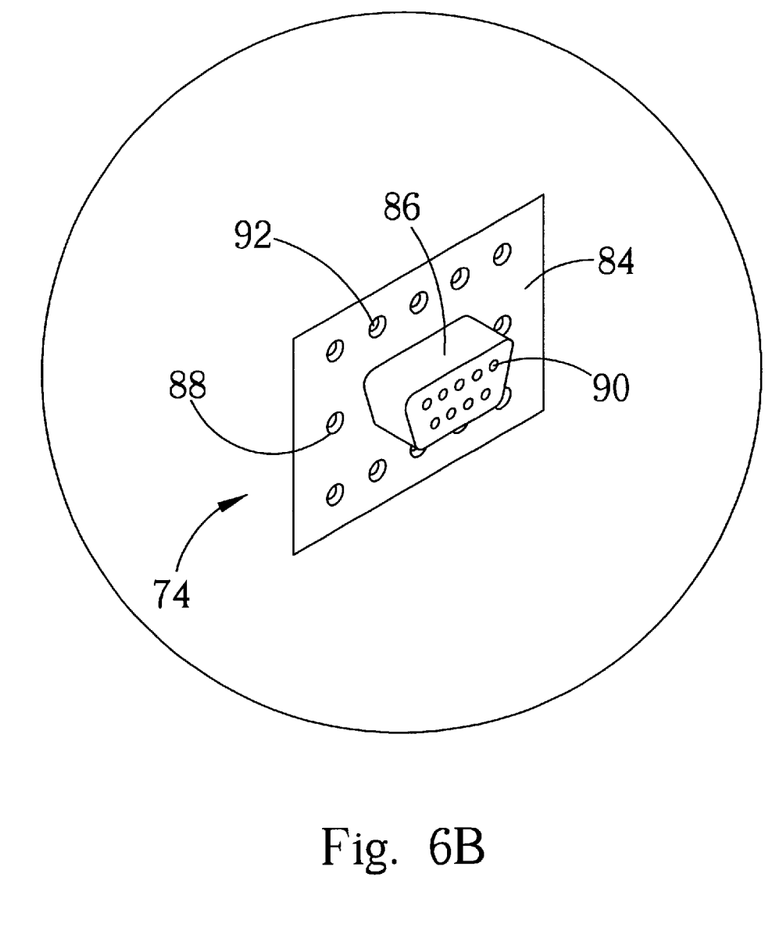
FIG. 6B is an enlarged view of the socket shown in FIG. 6A.

Please refer to FIGS. 6A and 6B. FIG. 6A is a perspective view of another embodiment connector 70 according to the present invention. FIG. 6B is an enlarged view of the socket 74 shown in FIG. 6A. The difference between the connector 70 and the connector 30 is the design of the socket 74 and, correspondingly, the design of the plug 72 of the peripheral device 32. The plug 72 comprises a first surface 76 and a recess 78 installed in a central area of the first surface 76. The signal contacts 80 of the plug 72 are installed in the recess 78, and the power contacts 82 of the plug 72 project from the first surface 76 and surround the recess 78.

The socket 74 comprises a second surface 84, a platform 86 projecting from a central area of the second surface 84, and a plurality of holes 88 are installed in the second surface 84 that surround the platform 86. Signal contacts 90 of the socket 74 are installed in the platform 86, and power contacts 92 of the socket 74 are installed in the holes 88 in the second surface 84.

When the plug 72 is plugged into the socket 74, the platform 86 of the socket 74 is embedded into the recess 78 of the plug 72 so that the signal contacts 80 of the plug 72 are connected to the corresponding signal contacts 90 of the socket 74, and the projecting power contacts 82 of the plug 72 are embedded into the holes 88 of the socket 74 so that the power contacts 82 of the plug 72 are connected to the corresponding power contacts 92 of the socket 74.

Likewise, the power contacts 82 of the plug 72 can separate from the plug 72. The portion of the first surface 76 that surrounds the recess 78 and contains the power contacts 82 of the plug 72 is detachably connected to the plug 72 itself. When the portion that surrounds the recess 78 is separated from the recess 78, the plug 72 only comprises the signal contacts 80. The peripheral device 32 might further comprises a power plug 51 to obtain electrical power from another power supply.

Because different peripheral devices have different electrical requirements, different peripheral devices may have different plugs. If the peripheral device is a hard disk, modem, or LCD terminal, the plug can comprise both signal contacts and power contacts for transmitting signals to or from the computer system 34 and obtaining power from the power contacts of the connector 30 or 70. If the peripheral device is a CRT terminal, the plug will not comprise power contacts, and then another power supply is required for the peripheral device to provide power.

Compared to the prior art connector 10, the connector 30, 70 according to the present invention comprises the plurality of signal contacts 52, 90 and power contacts 54, 92. When the peripheral device 32 is connected to the computer system 34 through the connector 30, 70, not only can signals be transmitted between the peripheral device 32 and the computer system 34, but also electrical power can be provided to the peripheral device 32 by the computer system 34. As a result, the peripheral device 32 need not further comprise a separate power plug to obtain electrical power, which reduces cable tangling. In addition, the power contacts 48, 82 of the plug 44, 72 in the present invention can be separated from the plug 44, 72, and so the peripheral device 32 can also obtain electrical power from a separate power supply.

Those skilled in the art will readily observe that numerous modifications and alterations of the device may be made while retaining the teachings of the invention. Accordingly, the above disclosure should by construed as limited only by the metes and bounds of the appended claims.

What is claimed is:

1. A connecting interface for connecting a peripheral device to a computer system, the connecting interface comprising a connector and a plug, the computer system comprising a housing, a processor installed in the housing for controlling the operations of the computer system, and a power supply installed in the housing for supplying electrical power to the computer system, the peripheral device comprising at least one peripheral circuit for executing a specific peripheral function, the plug electrically connecting to the peripheral circuit and comprising a plurality of signal contacts installed on a first housing of the plug for transmitting signals to or from the peripheral circuit, the connector comprising a socket installed on the housing, the socket comprising:

a plurality of signal contacts electrically connected to the computer system; wherein when the plug of the peripheral device is plugged into the socket of the connector, the signal contacts in the plug of the peripheral device will contact corresponding signal contacts in the socket so as to transmit signals between the computer system and the peripheral device; and a plurality of power contacts connected to the power supply for supplying electrical power;

wherein the plug of the peripheral device further comprises a plurality of power contacts installed on a second housing of the plug for connecting to the power contacts in the socket of the connector so that electrical power is supplied to the peripheral device through the power contacts, the second housing of the plug can separate from the plug so that the plug does not comprise any of the power contacts, when the plug comprises the plurality of power contacts, the plug comprises a first surface and a platform projecting from a central area of the first surface, the signal contacts of the plug are installed in the platform, the power contacts of the plug project from the first surface and surround the platform, the socket comprises a second surface, a recess installed in a central area of the second surface, and a plurality of holes in the second surface and surrounding the recess, the signal contacts of the socket are installed in the recess, and the power contacts of the socket are installed in the holes in the second surface; wherein when the plug is plugged into the socket, the platform of the plug is embedded in the recess of the socket so that the signal contacts of the plug are connected to the corresponding signal contacts of the socket, and the projecting power contacts of the plug are embedded in the holes of socket so that the power contacts of the plug are connected to the corresponding power contacts of the socket.

2. The connecting interface of claim 1 wherein the portion of the first surface that surrounds the platform and contains the power contacts of the plug is detachably connected to the platform.

3. The connector of claim 1 wherein the peripheral device is a hard disk and the plug of the hard disk comprises the power contacts for connecting to the power contacts of the connector so as to obtain electrical power.

4. The connector of claim 1 wherein the peripheral device is a modem and the plug of the modem comprises the power contacts for connecting to the power contacts of the connector so as to obtain electrical power.

5. The connector of claim 1 wherein the peripheral device is an LCD terminal and the plug of the LCD terminal comprises the power contacts for connecting to the power contacts of the connector so as to obtain electrical power.

6. The connector of claim 1 wherein the peripheral device is a CRT terminal, and the plug of the CRT terminal does not comprise the power contacts so that another power supply is required for supplying electrical power to the CRT terminal.

7. A connecting interface for connecting a peripheral device to a computer system, the connecting interface comprising a connector and a plug, the computer system comprising a housing, a processor installed in the housing for controlling the operations of the computer system, and a power supply installed in the housing for supplying electrical power to the computer system, the peripheral device comprising at least one peripheral circuit for executing a specific peripheral function, the plug electrically connecting to the peripheral circuit and comprising a plurality of signal contacts installed on a first housing of the plug for transmitting signals to or from the peripheral circuit, the connector comprising a socket installed on the housing, the socket comprising:

a plurality of signal contacts electrically connected to the computer system; wherein when the plug of the peripheral device is plugged into the socket of the connector, the signal contacts in the plug of the peripheral device will contact corresponding signal contacts in the socket so as to transmit signals between the computer system and the peripheral device; and a plurality of power contacts connected to the power supply for supplying electrical power;

wherein the plug of the peripheral device further comprises a plurality of power contacts installed on a second housing of the plug for connecting to the power contacts in the socket of the connector so that electrical power is supplied to the peripheral device through the power contacts, the second housing of the plug can separate from the plug so that the plug does not comprise any of the power contacts, when the plug comprises the plurality of power contacts, the plug comprises a first surface and a recess installed in a central area of the first surface, the signal contacts of the plug are installed in the recess, the power contacts of the plug project from the first surface and surround the recess, the socket comprises a second surface, a platform projecting from a central area of the second surface, a plurality of holes installed in the second surface surrounding the platform, the signal contacts of the socket are installed in the platform, and the power contacts of the socket are installed in the holes in the second surface; wherein when the plug is plugged into the socket, the platform of the socket is embedded in the recess of the plug so that the signal contacts of the plug are connected to the corresponding signal contacts of the socket, and the projecting power contacts of the plug are embedded in the holes of the socket so that the power contacts of the plug are connected to the corresponding power contacts of the socket.

8. The connecting interface of claim 7 wherein the portion of the first surface that surrounds the recess and contains the power contacts of the plug is detachably connected to the plug.

* * * * *